Sept. 24, 1957        W. E. ARRAIN        2,807,705
COMBINATION ELECTRIC WIRE STRIPPER AND WELDER
Filed May 13, 1955        2 Sheets-Sheet 1
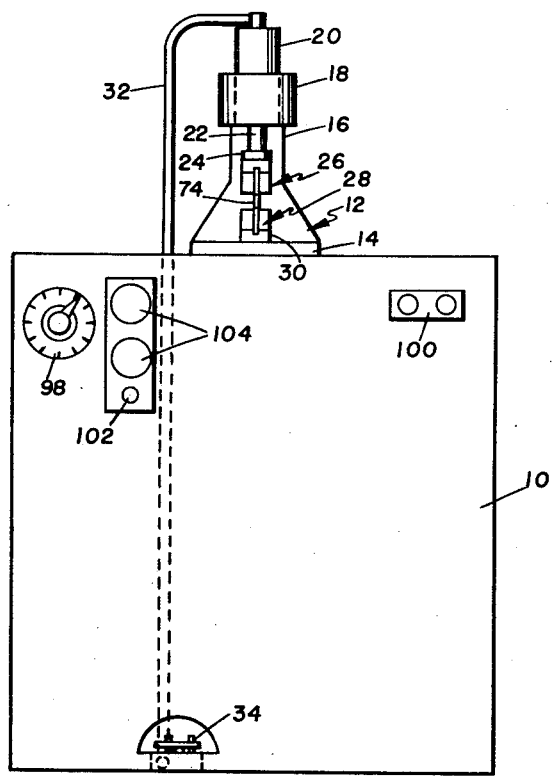
Fig. 1
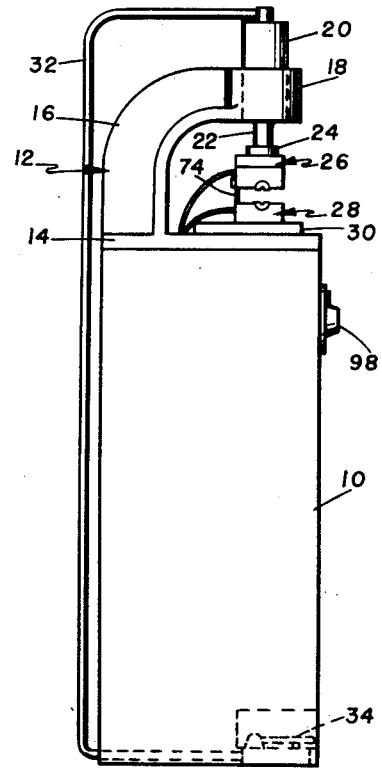
Fig. 2
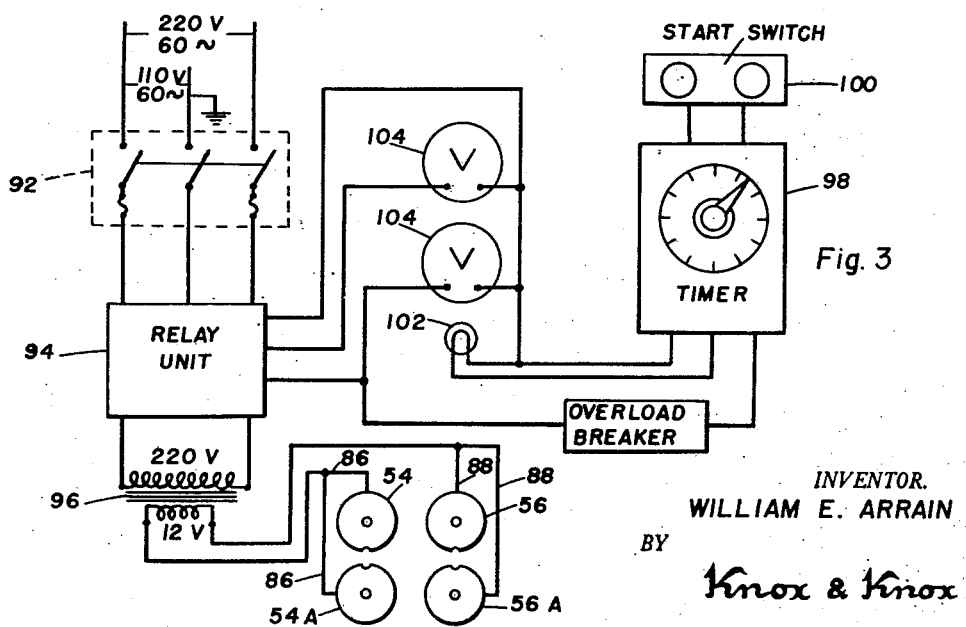
INVENTOR.
WILLIAM E. ARRAIN
BY
Knox & Knox Sept. 24, 1957 W. E. ARRAIN 2,807,705
COMBINATION ELECTRIC WIRE STRIPPER AND WELDER
Filed May 13, 1955 2 Sheets-Sheet 2
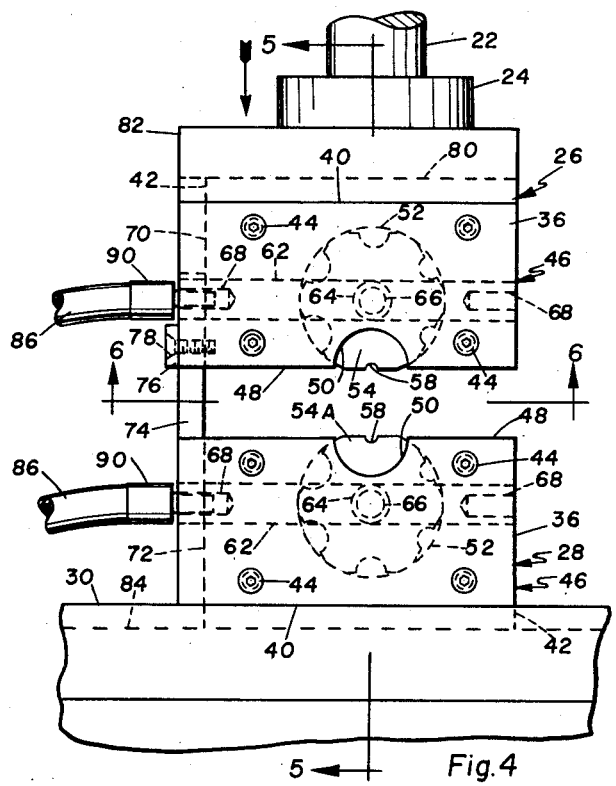
Fig. 4
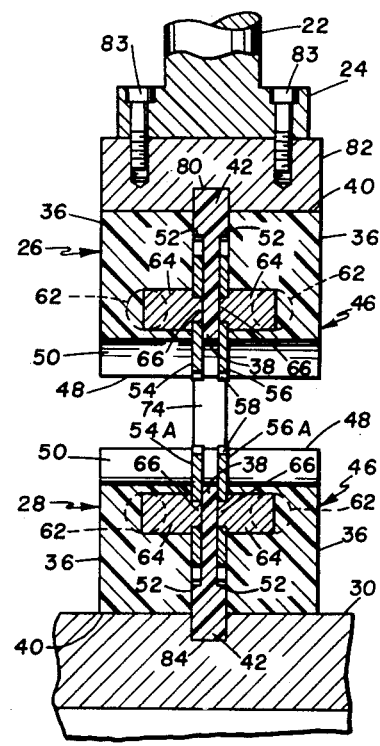
Fig. 5
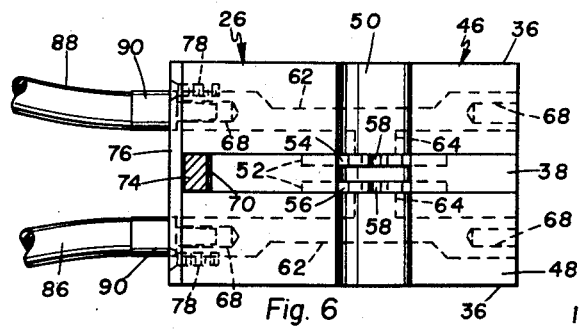
Fig. 6
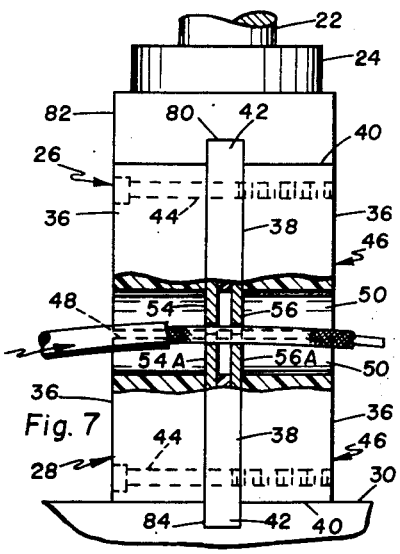
Fig. 7
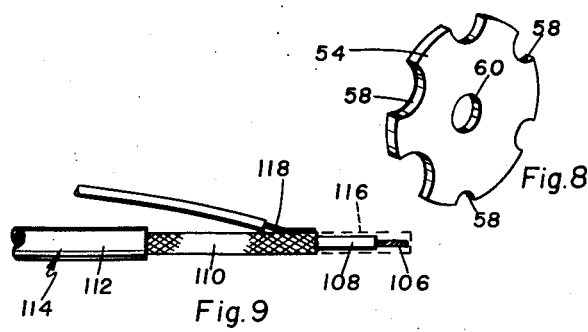
Fig. 8
Fig. 9
INVENTOR.
WILLIAM E. ARRAIN
BY
Knox & Knox

United States Patent Office

2,807,705
Patented Sept. 24, 1957

2,807,705

COMBINATION ELECTRIC WIRE STRIPPER AND WELDER

William E. Arrain, San Diego, Calif.

Application May 13, 1955, Serial No. 508,166

6 Claims. (Cl. 219—68)

The present invention relates generally to wire strippers and more particularly to a combination electric wire stripper and welder.

The primary object of this invention is to provide a stripper which electrically severs the braided metallic shielding of shielded wire, without damaging the other insulation of the wire, so that the unwanted portion of shielding is easily slipped off the wire.

Another object of this invention is to provide a stripper having power operated jaws to hold the wire, the jaws being adjustable to accommodate various sizes of wire.

Another object of this invention is to provide a stripper which can also be used to weld a pigtail or lead wire to the shielding at the point of severing.

An object ancillary to the immediately preceding object is to provide a machine which will weld such a pigtail in place at the same time as the shielding is parted for the shielding stripping operation.

Finally, it is an object to provide a stripper of the aforementioned character which is simple, safe and convenient to operate, and which will give generally efficient and durable service.

With these and other objects definitely in view, this invention consists in the novel construction, combination and arrangement of elements and portions, as will hereinafter be fully described in the specification, particularly pointed out in the claims, and illustrated in the drawings which form a material part of this disclosure and wherein similar characters of reference indicate similar or identical elements and portions throughout the specification and throughout the views of the drawings, and in which:

Fig. 1 is a front elevation view of the complete device.

Fig. 2 is a side elevation view thereof.

Fig. 3 is a schematic wiring diagram of the device.

Fig. 4 is an enlarged side elevation view of the wire clamping jaws.

Fig. 5 is a sectional view taken on the line 5—5 of Fig. 4.

Fig. 6 is a sectional view taken on the line 6—6 of Fig. 4.

Fig. 7 is a front elevation view, partially cut away, of the clamping jaws in closed portion with a wire in stripping position.

Fig. 8 is a perspective view of the adjustable electrode disc used in the jaws.

Fig. 9 is an elevation view of a wire end showing the shielding removed and a pigtail attached.

Referring now to the drawings in detail, the device includes an upright stand 10 of any suitable construction in which all the electrical components are contained. Fixed on top of the stand 10 is a frame 12 having a base plate 14 from which extends an upright support 16 having a forwardly projecting arm 18 at the upper end thereof. Secured in the forward end of the arm 18 is a fluid actuated cylinder 20 having a vertically movable piston 22. The lower end of the piston 22 has a flange 24 to which is secured an upper clamp block 26, below which is a similar lower clamp block 28 mounted on a bed plate 30 which is fixed to the base plate 14. The cylinder 20 is connected by a pipe 32 to a foot actuated valve 34 conveniently mounted in the base of the stand 10, the valve, of course, being connected to a suitable source of pressurized fluid.

The clamp blocks 26 and 28 are similar in structure so, for simplicity, the upper clamp block 26 will be described. This clamp block 26 comprises a pair of rectangular side blocks 36 of insulated material separated by an insulated spacer 38, said spacer extending beyond the outer faces 40 of the side blocks to provide a longitudinal key 42. The side blocks 36 and spacer 38 are secured together as a unit by bolts 44 to form an insulated block assembly 46, and extending transversely across the inner face 48 of the block assembly 46 is a groove 50 which is substantially semi-circular in cross-section. The spacer 38 has a pair of circular sockets 52 on the opposite sides thereof in back to back relation, said socket opening into the groove 50. These sockets 52 are for holding the electrode discs 54 and 56 which protrude into the groove 50 and project slightly beyond the inner face 48. All of the electrode discs are identical in structure, but those in the lower clamp block 28 are numbered 54A and 56A for convenience of description, as will later be apparent. Each electrode disc has a plurality of semi-circular notches 58 for progressively increasing size around its outer periphery, said notches being shaped to fit the various standard sizes of shielded wire, and in the center of each electrode disc is a circular bore 60. Extending longitudinally through each side block 36 is an electrically conductive bus bar 62 having an inwardly projecting boss 64 on which is a plug 66 dimensioned to fit tightly into the bore 60 of each electrode disc. The bus bars 62 extend to each end of the side blocks 36 and the ends of the bars are drilled to provide sockets 68.

The spacers 38 are slightly shorter than the side blocks 36 so that a channel 70 is left between the side blocks at the rear end of the upper clamp block 26, the lower clamp block 28 having a similar channel 72. Fixed in the channel 72 is a guide bar 74 which extends upwardly and fits slidably in the channel 70, said guide bar being retained in the channel 70 by a small retaining plate 76 secured to the side blocks 36 by screws 78. Thus the upper clamp block 26 is vertically slidable on the guide bar 74 which prevents the block from twisting out of alignment on the piston 22. The key 42 on the upper guide block 26 fits into a keyway 80 in a mounting plate 82, which is fixed to the flange 24 by screws 83. The key 42 on the lower clamp block 28 fits into a keyway 86 in the bed plate 30, the blocks being aligned so that the electrode discs 54 and 54A are vertically opposed and the other electrode discs 56 and 56A are similarly vertically opposed.

Electrical current is supplied to the electrode discs by conductors 86 and 88 which have terminal plugs 90 to fit into the sockets 68 of the bus bars 62. As shown in Fig. 3, the electrode discs 54 and 54A are connected together to one side of the power supply and the electrode discs 56 and 56A are connected together to the other side of the power supply. Power is supplied from a convenient source through a master switch 92 to a relay unit 94, connected to which is a transformer 96 which supplies low voltage, high amperage current to the electrode discs. Also connected to the relay unit 94 is a timer 98 and a start switch 100, an indicator lamp 102 being provided to show when the unit is operating and voltmeters 104 being included in the circuit for convenience. The electrical circuitry shown is exemplary only and may be arranged to suit particular requirements. The timer 98, switch 100, may be conveniently located on the front of the stand 10 as in Fig. 1 for maximum accessibility.

The device is specifically for removing the braided metallic shielding from shielded electrical wire. Many tools have been developed for stripping rubber and plastic insulation from wire, but the metallic shielding is difficult to remove and the cut ends of the strands of wire often cause injury to the operator. A typical piece of the wire in question is illustrated in Fig. 9 in which a conductor 106 is enclosed in an insulated sleeve 108, the whole being enclosed in a braided wire shielding sleeve 110. Sometimes the shield itself is covered by an outer insulated sleeve 112 also, this outer sleeve being easily cut away when necessary. To remove a portion of the shielding the wire 114 is placed with the shield 110 across the electrode discs 54A and 56A the discs being arranged so that the correct size notches 58 are exposed. The valve 34 is then actuated to lower the upper clamp block 26 and clamp the wire between the pairs of electrode discs, as in Fig. 7. The timer 98 can be set for current flow for a predetermined very short time interval and the start switch 100 is actuated so that current flows between the pairs of electrode discs for this interval. The low voltage, high amperage current used causes the short section of shield between the pairs of electrode discs to melt and, when the upper clamp block 26 is raised the unwanted portion of shield, indicated in dash line at 116, is easily slipped from the end of the wire.

In addition to severing the shielding, the heating effect of the electric current may be used to fuse a lead wire or pigtail 118 to the shield 110 at the point of severing. This provides a convenient and often needed means for connecting the shield to ground. The exposed end of the pigtail 118 is held against the shield 110 when the latter is placed across the electrode discs, so that both operations are accomplished simultaneously.

The device as shown is particularly suited for handling large quantities of wire, such as in an assembly plant where many shielded wires are made up to specific requirements for wiring electronic equipment. However, the clamp blocks 26 and 28 may feasibly be mounted in a portable or hand held tool for certain purposes and need not necessarily be used in the fluid actuated clamp device as shown. If desired, such a portable tool may be used by connecting the conductors to the unused sockets 68 on the forward ends of the clamp blocks 26 and 28, thus utilizing the electrical circuitry of the illustrated stand type machine without dismantling any components.

The electrode discs 54, 54A, 56 and 56A are easily rotated, to bring the required pairs of notches 58 into operative position, merely by loosening the bolts 44 and turning the discs manually. When the discs are set, the bolts 44 are tightened to clamp the assembly rigidly together. By disassembling the clamp blocks 26 and 28, the electrode discs may be replaced when worn or different discs can be inserted to handle other sizes of wire.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the forms of the invention disclosed herein may be made without departure from the spirit and scope of the invention, and that the specification and drawing are to be considered as merely illustrative rather than limiting.

I claim:

1. A combination electric wire stripper and welder, comprising: a pair of block assemblies each including a pair of insulated side blocks and an insulated spacer fixed therebetween; said spacer having generally circular, shallow sockets on opposite sides thereof; electrode discs held in said sockets by said blocks; means for bringing said block assemblies together with said electrodes in opposed paired registration; means for connecting said electrodes with a source of electrical power; said electrodes each having a plurality of progressively sized notches therein; and said electrodes being rotatively adjustable to bring corresponding notches into registration to receive and hold pieces of electrical shielded wire, the corresponding pairs of notches constituting beds of different effective cross-sectional dimensions, the electrically opposed electrodes being very slightly spaced axially of said beds.

2. A combination electric wire stripper and welder, comprising: a support; a pair of similar block assemblies; one of said block assemblies being fixed on said support; the other of said block assemblies being slidably mounted; each of said block assemblies including a pair of insulated side blocks and an insulated spacer fixed therebetween; said spacer having generally circular, shallow sockets on opposite sides thereof; electrode discs held in said sockets by said blocks; means for bringing said block assemblies together with said electrodes in opposed paired registration; means for connecting said electrodes with a source of electrical power; said electrodes each having a plurality of progressively sized notches therein; and said electrodes being rotatively adjustable to bring corresponding notches into registration to receive and hold pieces of electrical shielded wire, the corresponding pairs of notches constituting beds of different effective cross-sectional dimensions, the electrically opposed electrodes being very slightly spaced axially of said beds.

3. A combination electric wire stripper and welder, comprising: a support; a pair of similar block assemblies; one of said block assemblies being fixed on said support; the other of said block assemblies being slidably mounted; each of said block assemblies including a pair of insulated side blocks and an insulated spacer fixed therebetween; said spacer having generally circular, shallow sockets on opposite sides thereof; electrode discs held in said sockets by said blocks; said block assemblies having transverse grooves across one face thereof; said electrode discs projecting into said grooves; electrically conducting bars extending through said side blocks and having plug portions thereon to contact said electrode discs; means for bringing said block assemblies together with said electrodes in opposed paired registration; means for connecting said electrodes with a source of electrical power; said electrodes each having a plurality of progressively sized notches thereon; and said electrodes being rotatively adjustable to bring corresponding notches into registration to receive and hold pieces of electrical shielded wire, the corresponding pairs of notches constituting beds of different effective cross-sectional dimensions, the electrically opposed electrodes being very slightly spaced axially of said beds, the electrode discs physically opposed transversely of said bed being connected electrically and the electrode discs spaced axially of said bed being electrically opposed; whereby an electric current is passed between the paired electrodes along the shield of a wire held thereby.

4. A combination electric wire stripper and welder, comprising: a stand; a frame mounted on said stand and having a fluid actuated cylinder mounted thereon; a block assembly operably attached to said cylinder; a second block assembly fixed on said frame in alignment with said first mentioned block assembly; each of said block assemblies including a pair of insulated side blocks and an insulated spacer fixed therebetween; said spacer having generally circular, shallow sockets on opposite sides thereof; electrode discs held in said sockets by said blocks; said electrode discs being positioned to register in opposed pairs when said block assemblies are brought together; said electrode discs each having a plurality of progressively sized notches and being rotatively adjustable to bring corresponding notches into registration to receive and hold a piece of electrical shielded wire therebetween; the opposed pairs of electrode discs being operatively connected to a source of power, such that a current is passed between the paired electrodes along the shield of a wire held thereby.

5. A combination electric wire stripper and welder, comprising: a stand; a frame mounted on said stand and having a fluid actuated cylinder mounted thereon; a block assembly operably attached to said cylinder; a second block assembly fixed on said frame in alignment with said first mentioned block assembly; each of said block assemblies including a pair of insulated side blocks and an insulated spacer fixed therebetween; said spacer having generally circular, shallow sockets on opposite sides thereof; electrode discs held in said sockets by said blocks; said block assemblies having transverse grooves across one face thereof; said electrode discs projecting into said grooves; said electrode discs being positioned to register in opposed pairs when said block assemblies are brought together; said electrode discs each having a plurality of progressively sized notches and being rotatively adjustable to bring corresponding notches into registration to receive and hold a piece of electrical shielded wire therebetween; the opposed pairs of electrode discs being operatively connected to a source of power, such that a current is passed between the paired electrodes along the shield of a wire held thereby.

6. A combination electric wire stripper and welder, comprising: a stand; a frame mounted on said stand and having a fluid actuated cylinder mounted thereon; a block assembly operably attached to said cylinder; a second block assembly fixed on said frame in alignment with said first mentioned block assembly; a guide bar fixed to one of said block assemblies and slidably engaging the other; each of said block assemblies including a pair of insulated side blocks and an insulated spacer fixed therebetween; said spacer having generally circular, shallow sockets on opposite sides thereof; electrode discs held in said sockets by said blocks; said block assemblies having transverse grooves across one face thereof; said electrode discs projecting into said grooves; said electrode discs being positioned to register in opposed pairs when said block assemblies are brought together; said electrode discs each having a plurality of progressively sized notches and being rotatively adjustable to bring corresponding notches into registration to receive and hold a piece of electrical shielded wire therebetween; the opposed pairs of electrode discs being operatively connected to a source of power, such that a current is passed between the paired electrodes along the shield of a wire held thereby.

References Cited in the file of this patent

UNITED STATES PATENTS

| | | |
|---|---|---|
| 453,164 | Ries | May 26, 1891 |
| 1,639,688 | Duncan | Aug. 23, 1927 |
| 2,202,580 | Hahn | May 28, 1940 |